US007236174B2

(12) United States Patent
Stamm et al.

(10) Patent No.: US 7,236,174 B2
(45) Date of Patent: Jun. 26, 2007

(54) ADAPTIVELY FILTERING OUTLINES OF TYPOGRAPHIC CHARACTERS TO SIMPLIFY REPRESENTATIVE CONTROL DATA

(75) Inventors: Beat Stamm, Redmond, WA (US); Gregory C. Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 10/764,787

(22) Filed: Jan. 26, 2004

(65) Prior Publication Data

US 2005/0162428 A1 Jul. 28, 2005

(51) Int. Cl.
*G06T 11/00* (2006.01)
*G09G 5/26* (2006.01)

(52) U.S. Cl. ....................... 345/467; 345/469; 345/472

(58) Field of Classification Search ...... 345/46–472.37
See application file for complete search history.

(56) References Cited

U.S. PATENT DOCUMENTS

| | | | | |
|---|---|---|---|---|
| 4,387,622 | A | 6/1983 | Deutsch | 84/1.22 |
| 4,696,707 | A * | 9/1987 | Lewis et al. | 156/64 |
| 4,884,225 | A * | 11/1989 | Fogarty et al. | 382/133 |
| 5,155,805 | A | 10/1992 | Kaasila | 395/151 |
| 5,159,668 | A | 10/1992 | Kaasila | 395/151 |
| 5,319,358 | A * | 6/1994 | Martinez et al. | 345/469 |
| 5,325,479 | A | 6/1994 | Kaasila | 395/151 |
| 5,412,770 | A | 5/1995 | Yamashita et al. | 395/142 |
| 5,465,323 | A | 11/1995 | Mallet | 395/123 |
| 5,500,927 | A * | 3/1996 | Sander-Cederlof et al. | 345/442 |
| 5,539,841 | A * | 7/1996 | Huttenlocher et al. | 382/218 |
| 5,586,241 | A | 12/1996 | Bauermeister et al. | 395/167 |
| 5,684,510 | A | 11/1997 | Brassell et al. | 345/143 |
| 5,715,473 | A | 2/1998 | Reed | 395/805 |
| 5,751,289 | A * | 5/1998 | Myers | 345/419 |
| 5,754,873 | A | 5/1998 | Nolan | 395/789 |
| 5,760,787 | A * | 6/1998 | Piper | 345/442 |
| 5,777,627 | A * | 7/1998 | Takazawa | 345/469 |

(Continued)

FOREIGN PATENT DOCUMENTS

WO PCT/WO98/36630 8/1998

OTHER PUBLICATIONS

Foley, James et al. "Computer Graphics: Principles and Practice. 2nd Edition in C." Addison-Wesley Publishing Company, New York, 1996. various pages.*

(Continued)

*Primary Examiner*—Ulka Chauhan
*Assistant Examiner*—Eric Woods
(74) *Attorney, Agent, or Firm*—Workman Nydegger

(57) ABSTRACT

The principles of the present invention relate to adaptively filtering outlines of typographic characters to simply representative control data. A filtering module receives a set of control points (and instructions for connecting the control points) representing a graphical object, such as, for example, a typographical character. The filtering module adaptively filters out some variations in the outline of the graphical object to reveal common edges of the outline. The filtering module generates simplified control data that represents an outline of the common edges (e.g., representing a block "T"). Accordingly, based on the simplified control data, a computing system may be able to more efficiently recognize the graphical object represented by the control points.

22 Claims, 7 Drawing Sheets

U.S. PATENT DOCUMENTS

| | | | | |
|---|---|---|---|---|
| 5,781,714 | A | 7/1998 | Collins et al. | 395/171 |
| 5,805,832 | A | 9/1998 | Brown et al. | 395/752 |
| 5,854,855 | A * | 12/1998 | Errico et al. | 382/187 |
| 5,898,439 | A * | 4/1999 | Takazawa | 345/441 |
| 5,949,435 | A * | 9/1999 | Brock et al. | 345/468 |
| 6,037,949 | A * | 3/2000 | DeRose et al. | 345/582 |
| 6,048,116 | A * | 4/2000 | Kumada | 400/76 |
| 6,088,041 | A | 7/2000 | Ballard et al. | 345/467 |
| 6,249,908 | B1 | 6/2001 | Stamm | 717/5 |
| 6,253,374 | B1 | 6/2001 | Dresevic et al. | 717/11 |
| 6,289,488 | B1 | 9/2001 | Dave et al. | 716/1 |
| 6,300,960 | B1 | 10/2001 | DeRose et al. | 345/474 |
| 6,363,405 | B1 | 3/2002 | Loginov | 708/270 |
| 6,373,489 | B1 * | 4/2002 | Lu et al. | 345/428 |
| 6,441,846 | B1 * | 8/2002 | Carlbom et al. | 348/169 |
| 6,452,597 | B1 * | 9/2002 | Goldberg et al. | 345/472 |
| 6,456,305 | B1 | 9/2002 | Qureshi et al. | 345/800 |
| 6,529,197 | B1 | 3/2003 | Ballard et al. | 345/468 |
| 6,600,485 | B1 | 7/2003 | Yoshida et al. | 345/419 |
| 6,600,490 | B1 * | 7/2003 | Brock et al. | 345/472 |
| 6,714,679 | B1 * | 3/2004 | Scola et al. | 382/199 |
| 6,760,028 | B1 | 7/2004 | Salesin et al. | 345/469 |
| 6,778,698 | B1 * | 8/2004 | Prakash et al. | 382/164 |
| 6,803,913 | B1 * | 10/2004 | Fushiki et al. | 345/467 |
| 6,826,480 | B2 * | 11/2004 | Picone et al. | 702/3 |
| 6,992,671 | B1 * | 1/2006 | Corona | 345/467 |
| 2001/0002131 | A1 | 5/2001 | DeRose et al. | |
| 2001/0032029 | A1 * | 10/2001 | Kauffman | 700/99 |
| 2001/0048764 | A1 | 12/2001 | Betrisey et al. | |
| 2003/0208473 | A1 | 11/2003 | Lennon | 707/3 |
| 2004/0109592 | A1 * | 6/2004 | Bankman et al. | 382/128 |
| 2004/0160444 | A1 * | 8/2004 | Salesin et al. | 345/471 |
| 2005/0005261 | A1 | 1/2005 | Severin | 717/108 |
| 2005/0089237 | A1 * | 4/2005 | Park et al. | 382/242 |
| 2005/0100214 | A1 * | 5/2005 | Zhang et al. | 382/179 |

OTHER PUBLICATIONS

Computer Graphic Forum / Extraction of Typographic Elements from Outline Representations of Fonts Ariel Shamir and Ari Rappoport 1996.

U.S. Appl. No. 10/764,745, filed Jan. 26, 2004, Beat Stamm et al.

U.S. Appl. No. 10/764,961, filed Jan. 26, 2004, Beat Stamm et al.

U.S. Appl. No. 10/764,622, filed Jan. 26, 2004, Beat Stamm et al.

Riccardo Di Federico, Mario Raffin, Paola Carrai, Giovanni Ramponi. *Image Processing: Algorithms and Systems II Interpolation of Images Containing Text For Digital Displays*, Proceedings of Electronic Imaging Science and Technology, 2003, pp. 42-53.

Garcia, Dan. *Discussion Section 3 Scan Conversion Distillations*. Published approximately Spring-Fall 1998, pp. 1-2.

Klasse, Victor R. and Janamanchi, Kalpana, *Resolution and Bit Depth: How Much is Enough?*, Human Vision and Electronic Imaging V, Jan. 2000, pp. 28-36.

Weisstein, Eric W. *Taylor Series*. From MathWorld—A Wolfram Web Resource. 1999.

*Designing Multiple Master Typefaces*. Adobe Systems Incorporated. 1995, 1997.

*Type 1 Font Format Supplement*. Adobe Developer Support, Technical Specification #5015. Adobe Systems Incorporated, May 15, 1994.

* cited by examiner

ADAPTIVELY FILTERING OUTLINES OF TYPOGRAPHIC CHARACTERS TO SIMPLIFY REPRESENTATIVE CONTROL DATA

BACKGROUND OF THE INVENTION

1. The Field of the Invention

The present invention relates to processing outlines of typographic characters that are to be rendered on a display. More specifically, the present invention relates to filtering the outline of a typographic character to simplify the control data that represents the typographic character.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. As time moves forward, processing capability may be incorporated into a number of devices that traditionally did not have processing capability. Accordingly, the diversity of computing systems may likely increase.

Almost all computing systems that interface with human beings use a display to convey information. In many cases, the appeal of the display is considered an important attribute of the computing system. Historically, textual information (e.g., Latin-based characters) was displayed in cells of a Cathode Ray Tube ("CRT") display device. Each cell was divided into a grid of equally sized grid positions wherein each grid position could be turned on or off. For example, each cell of a CRT could be an 8×8 grid resulting in 64 possible grid positions per cell.

Each character of a character set was stored as a memory image (a bit-map) in the hardware of the CRT display device (e.g., in the video adaptor). A memory image included a number of binary values (e.g., 64 binary values for displaying a character on an 8×8 grid), where each binary value corresponded to a specified grid position. One value (e.g., binary "1") represented that a corresponding grid position was to be "on" when the character was displayed and another value (e.g., a binary "0") represented that a corresponding grid position was to be "off" when the character was displayed. Upon receiving binary data (e.g., a bit-map) representing a character, the CRT would "turn on" grid positions corresponding to a binary 1 and would "turn off" grid positions corresponding to a binary 0 to display the character.

To somewhat reduce the computing system resources needed to store bit-maps, some operating systems have used proportional bit-maps (e.g., stored on disk) that vary in cell size depending on the character that is to be displayed. For example, in a proportional bit-map character set, the cell for the letter "i" could be more narrow (e.g., width of 3 grid positions or pixels) than the cell for the letter "h" (e.g., width of 6 grid positions or pixels).

However, storing characters as bit-maps (either fixed or proportional) can still consume significant computing system resources. Since a computing system may need to display and print characters of a font (typically 256 or more different characters) at a variety of different sizes, storage of a significant number of different sized bit-maps may be required. For example, it may desirable to have a word processor display and print characters of a font in sizes ranging from 4 pt to 72 pt. Thus, a computing system running the word processor would potentially have to store 68 (72 minus 4) different sizes of bit-maps for displaying the font at different sizes.

Further, since printers typically have different (and for the most part higher) resolution than displays, the computing system would potentially also have to store a corresponding 68 (72 minus 4) different sizes of bit-maps for printing the font at different sizes. For example, a bitmap of an 8×5 grid (requiring 40 bits of storage) may be used to display a character at a specified size, while a bit-map of a 50×30 grid (requiring 1500 bits of storage) is used to print the character at the specified size.

The storage requirement problems associated with bit-map fonts is further compounded when a computing device is to display and print characters from different fonts. That is, the computing device may need to store bit-maps for representing a variety of different fonts at a variety of different sizes. Thus, in the above example, configuring the word processor to use 50 different fonts could result in well over 5,000 different sets of bit-maps (e.g., (68+68)*50). Since many character sets include 256 or more characters, this could easily result over 1 million individual bit-maps (e.g., 5,000*256). Storing bit-maps for underlined, bold, and/or italicized versions of each font can further increase the storage requirements. Further, producing a large number of bitmaps by hand is extremely time consuming.

Accordingly, even more recently, graphics primitives have been used to describe characters of a font. For example, a set of control points and instructions for connecting the points (e.g., connect with a straight line, an arc, a Bezier, etc.) can be used to define the outline of a character in an arbitrary grid space (e.g., an arbitrary grid space greater than the highest resolution of a pixelated device). Often, characters will be defined for display at higher resolutions and then mathematically scaled down when the characters are to be rendered at lower resolutions. Thus, only one representation of a character (per font) need be stored.

To scale a character down the location of control points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, a smaller outline representing the character may be calculated and there is a reduced need for storing a number of different sizes of bit-maps for the character.

The smaller outline can then be analyzed to identify grid locations that are to be turned on and to identify grid locations that are to be turned off (a process often referred to as "scan conversion"). One scan conversion algorithm determines if the center of a grid position is inside or outside the smaller outline. When the center of a grid position is inside the smaller outline the grid position is turned on. On the other hand, when the center of a grid position is outside the smaller outline the grid position is turned off.

However, at times, and especially at lower resolutions, the results of scan conversion produce an unacceptable representation of a character. Unacceptable character representations can result from rounding errors in the scaling down process. Further, rounding errors have a greater affect on character representation when a single grid location (a pixel)

is on scale with the features of a character. For example, a rounding error that causes one grid location (a pixel) to be inappropriately turned on (or turned off) on a 50×50 grid may not even be detectable by the human eye. However, a rounding error that causes one grid location (a pixel) to be inappropriately turned on (or turned off) on a 4×4 grid may result in a character that is perceived as unacceptable to the human eye. At lower resolutions scan conversion can even fail to preserve the topology of the original outline of the character, resulting in disconnected grid locations.

To compensate for the sometimes inappropriate results of scan conversion, character outlines can be supplemented with rules (often referred to as "hints") that assist in identifying whether grid locations are to be turned on or off when a character is rendered. The highest quality hinting (e.g., to add hints needed for appropriate display at lower resolutions)_is typically a manual process performed by a human typographer. The typographer views a character at various sizes and supplements a higher resolution outline of the character with computer-executable instructions that indicate how to render the character at lower resolutions. When the character is to be rendered, a computing system processes the computer-executable instructions and renders the character in accordance with the rules implemented in the computer-executable instructions.

Different hints can be included to assist in rendering a character at different sizes. For example, at a first size, a more accurate representation of a character may be obtained by turning off a grid location even though the center of the grid location is within the character outline. However, at a second size, a more accurate representation of the character may be obtained by turning on the grid location even though the center of the grid location is outside the character outline. Thus, hints can cause a character representation that does not necessarily conform to the character outline, but that better preserves the character shape to be rendered.

Manual hinting is advantageous since a human typographer can typically recognize a character simply by viewing the character. That is, a human typographer can recognize a character even when the character's features have variations or the character includes supplemental features, such as, for example, serifs. For example, a human typographer can easily identify a "T" even if each end of the horizontal crossbar includes a serif and/or if the vertical stroke or horizontal cross bar includes some arcs or beziers. However, manual hinting can consume a considerable amount of time. For example, it may take weeks or even months for a trained typographer to hint a single font.

Automated hinting as performed by a computing system is difficult to implement since a computing system has no inherent understanding of what is represented by a set of control points. Before a character can be automatically hinted, the computing system must recognize the features of the character that is to be hinted. For example, before a computing system can appropriately hint a set of control points used to render the letter "C", the computing system must recognize the features of the letter "C". That is, the computing system may need to at least identify a vertical round stroke on the left and horizontal round strokes at the top and bottom as well as the positions and orientations of these features.

Some Optical Character Recognition ("OCR") mechanisms attempt to recognize character features based on bitmaps. However, these OCR mechanisms typically do not analyze outlines used to generate characters. Further, since many fonts include variations in character features and/or include supplemental character features (e.g., serifs), automated character recognition is difficult. For example, it may be difficult for a computing system to recognize the vertical edges of a "T" when control points of the vertical edges are connected by arcs (resulting in a wavy appearance when rendered). Therefore, what would be advantageous are mechanisms for filtering outlines of typographic characters to simplify the representative control data.

BRIEF SUMMARY OF THE INVENTION

The principles of the present invention relate to adaptively filtering outlines of typographic characters to simplify representative control data. A filtering module receives a set of control points (and instructions for connecting the control points) representing a graphical object, such as, for example, a typographical character. The filtering module adaptively filters out some variations in the outline of the graphical object to reveal common edges of the outline. The filtering module generates simplified control data that represents an outline of the common edges (e.g., representing a block "T"). Accordingly, based on the simplified control data, a computing system may be able to more efficiently recognize the graphical object represented by the control points.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter .

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
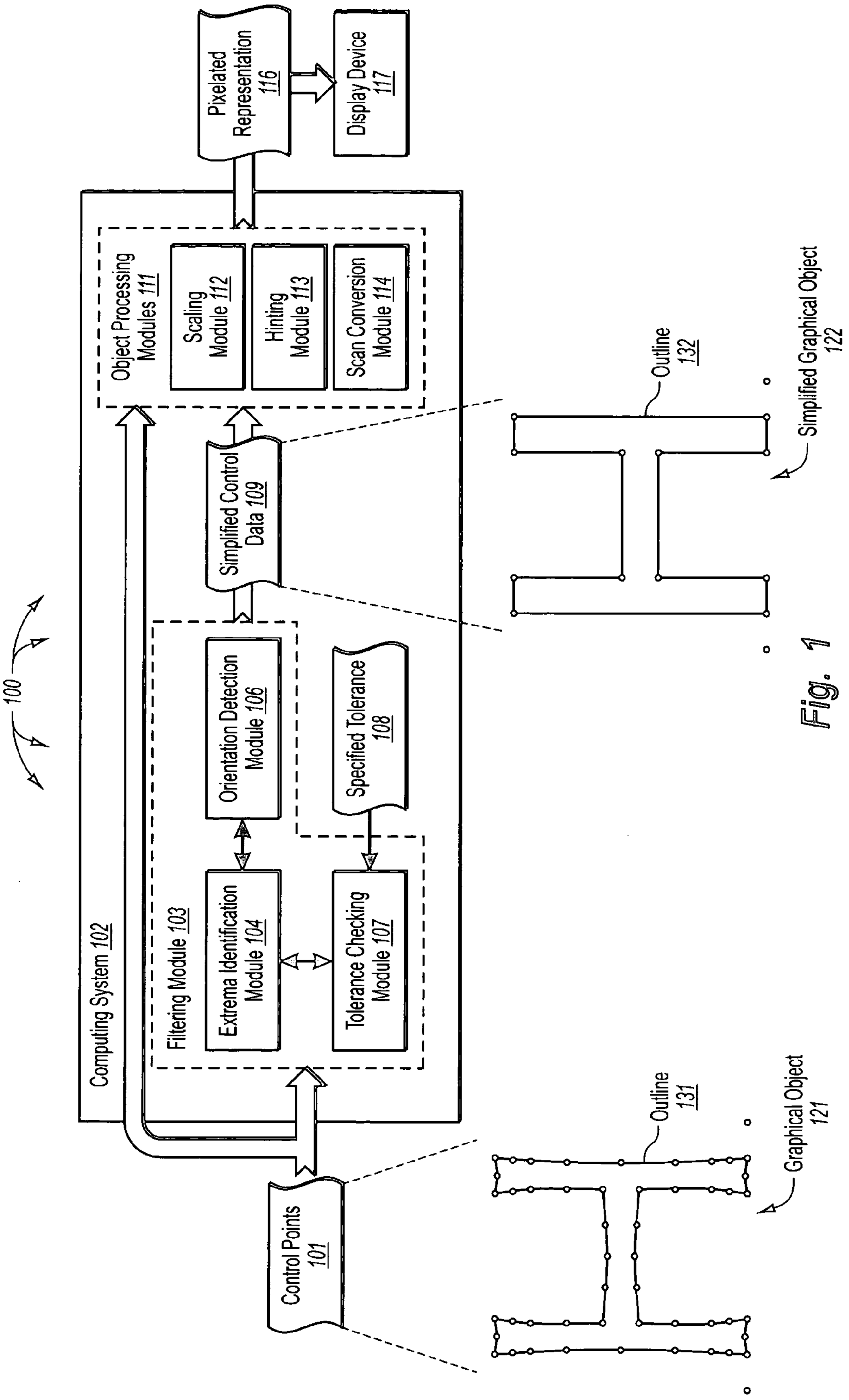
FIG. 1 illustrates a computer architecture in accordance with the principles of the present invention.

The principles of the present invention relate to systems, methods, and computer program products for adaptively filtering outlines of typographic characters to simplify representative control data. A filtering module receives a set of control points (and instructions for connecting the control points) representing a graphical object, such as, for example, a typographical character. The filtering module adaptively filters out some variations in the outline of the graphical object to reveal common edges of the outline. For example, control points used for arcs or Beziers in the vertical stroke of a "T" may be filtered out to reveal the common vertical edges of the vertical stroke. The filtering module generates simplified control data that represents an outline of the common edges (e.g., representing a block "T"). Accordingly, based on the simplified control data, a computing system may be able to unambiguously (and more efficiently) recognize a feature of the graphical object (e.g., a straight edge) represented by the control points.

Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of computer architecture 100 for filtering the outlines of typographic characters to simplify representative control data in accordance with the principles of the present invention. Within computer architecture 100, computing system 102 includes filtering module 103 and object processing modules 111. Generally, control points (e.g., control points 101) representing a more complex outline (e.g., outline 131) of graphical object (e.g., graphical object 121) are received at filtering module 103. Filtering module 103 adaptively filters out some variations in the more complex outline to reveal common edges of a simplified outline. Filtering module 103 generates simplified control data (e.g., simplified control data 109) for representing the simplified outline (e.g., outline 132) of the graphical object (e.g., simplified graphical object 122).

Embodiments of the invention facilitate identifying edges regardless of variations in font design. Knowledge of the identified edges can then be translated into hinting instructions relevant to the particular local topology of the identified edges. For example, an edge which by design consists of two control points connected by a straight line will not require elaborate hinting instructions for an appropriate pixelated representation. Accordingly, simplified control data may be essentially identical to received control points. On the other hand, an edge which by design contains variations will have hinting instructions that will "iron-out" these variations depending upon the targeted type size and device resolution in order to achieve the best possible pixilated representation for each of these type sizes and device resolutions. Accordingly, simplified control data may included significantly less data than received control points yet still facilitate appropriate hinting.

The simplified control data is sent to object processing modules 111 (potentially along with the control points) for subsequent manipulation, such as, for example, hinting, scaling, and scan conversion, that results in a pixelated representation (pixelated representation 116) of the graphical object. The simplified control data can facilitate (more efficient) recognition of the graphical object (e.g., recognition that the graphical object is the character "H"). Recognition of the graphical object from the simplified control data can assist object processing modules 111 in appropriately manipulating the control points such that a better pixelated representation of the graphical object is rendered at display device 117. For example, knowing that control points 101 render the outline of the character "H", hinting module 113 may be able to supplement control points 101 with computer-executable instructions for rendering a better pixelated representation of the character "H".

The pixelated representation is rendered at an output device (e.g., display device 117), such as, for example, a color or monochrome computer monitor, Liquid Crystal Display ("LCD"), or printer. Computing system 102 (or some other computing system associated with display device 117) can include a processor that processes computer-executable instructions (e.g., indicating how to connect control points and/or implementing hints) for rendering a graphical object.

Figure 2:
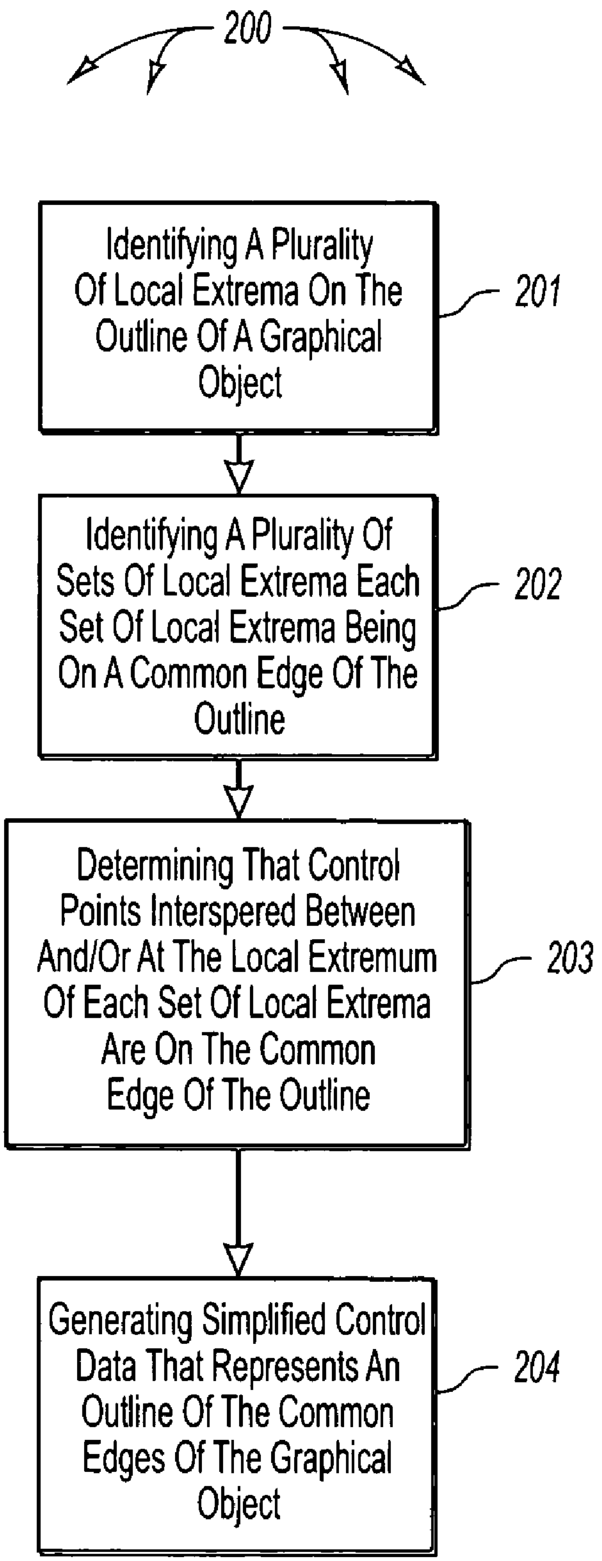
FIG. 2 illustrates a flowchart of a method for simplifying control data that represents the outline of a graphical object.

FIG. 2 illustrates a flowchart of a method 200 for simplifying the control data that represents the outline of a graphical object. Method 200 will be described with respect to the computing system, modules, and data depicted in FIG. 1. Method 200 includes an act of a computer system identifying a plurality of local extrema on the outline of the graphical object (act 201). For example, extrema identification module 104 can identify local extrema on outline 131. A local extremum can be identified as a point on the outline whose immediate adjacent points (which may be one or more points) all have either larger or smaller coordinates in a specified direction, such as, for example, in the X or Y direction of a grid.

Figure 3:
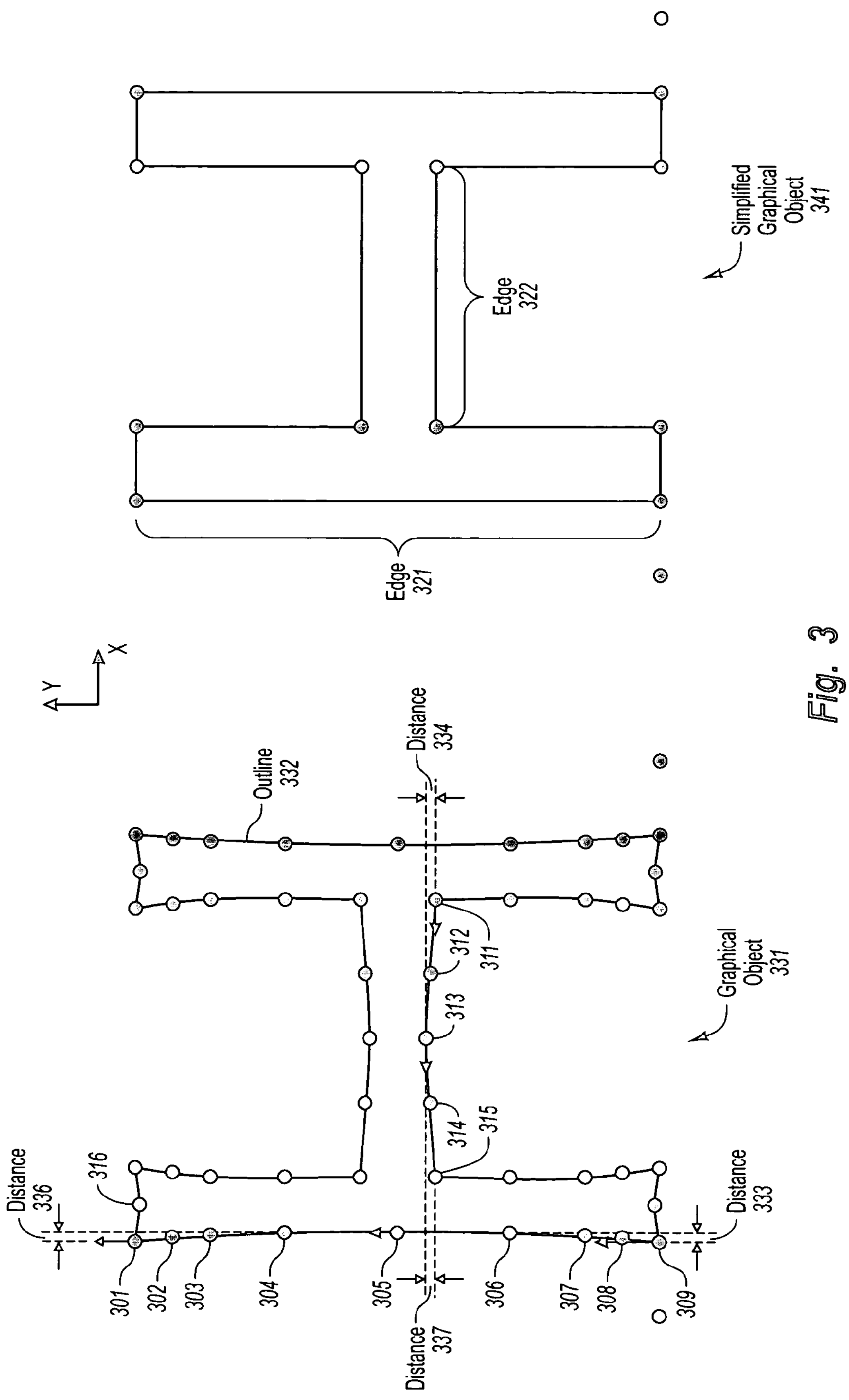
FIG. 3 illustrates a first example of a graphical object and a corresponding simplified graphical object.

Referring now to FIG. 3, control point 305 can be identified as a local extremum since control points 304 and 306 both have smaller coordinates in the X direction. It may be that a control point is also a local extremum. However, depending on the curves used to connect control points, a local extremum can identified anywhere on an outline including locations other than the location of control points. Similarly, control point 313 can also be identified as a local extremum since control points 312 and 314 both have smaller coordinates in the Y direction. Other local extrema on outline 332 can be similarly identified.

In FIG. 3, control points 301 and 309 and control points 315 and 311 can also be processed as if the control points were identified as local extrema. While these control points may not necessarily meet criteria that identify them as local extrema, a filtering algorithm (e.g., in filtering module 103) may handle them as local extrema to simplify the implementation. It may be that a control point is a local extremum in multiple directions. For example, control point 301 can be identified as a local extremum in the Y direction since control point 302 has a greater X coordinate and as a local extremum in the X direction since control point 316 has a smaller Y coordinate. Other local extrema on outline 332 can be similarly identified.

Extrema Identification module 104 can analyze control points (e.g., control points 101) and computer-executable instructions for connecting control points to identify local extremum on an outline. Analysis of an outline can include calculating derivatives of equations representing arcs and/or beziers that connect control points. Solutions to calculated derivates can be identified as critical points. Critical points can be identified as local extremum when represented arcs and/or beziers appropriately increase/decrease along a specified axis.

Method 200 includes an act of a computer system identifying a plurality of sets of local extrema, each local extremum in a set of local extrema being on a common edge of the outline of the graphical object (act 202). For example, orientation detection module 106 and tolerance checking module 107 can interoperate to identify sets of local extrema on outline 131.

Figure 4:
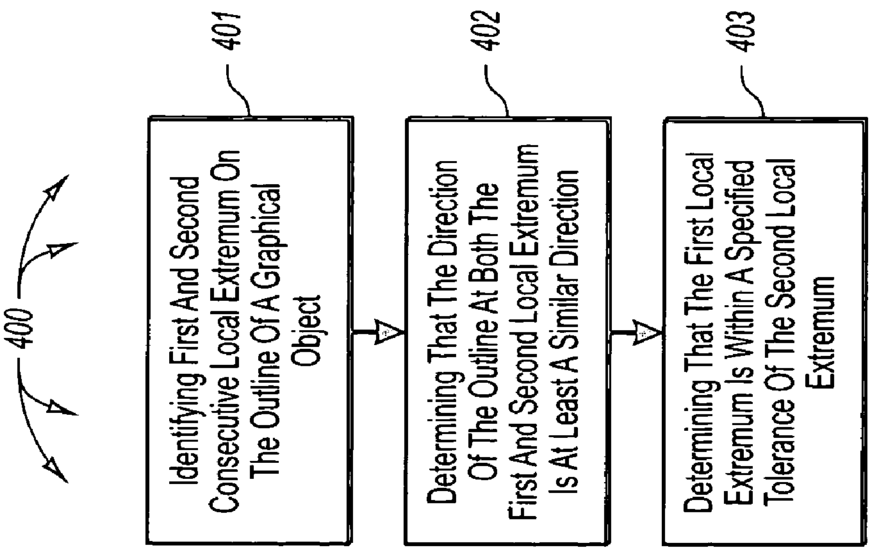
FIG. 4 illustrates a flowchart of a method for determining that a plurality of local extrema are on a common edge of the graphical object outline.

Referring now to FIG. 4, there is shown a more detailed flowchart of a method 400 for determining that a plurality of local extrema (a set) are on a common edge of a graphical object outline. The method 400 includes an act of identifying first and second local extrema on the outline (act 401). For example, referring back to FIGS. 1 and 3, extrema identification module 104 can identify that local extrema at control points 309 and 305 are consecutive local extrema on outline 332.

The method 400 includes an act of determining that the direction of the outline at both the first and second consecutive local extrema is at least in a similar direction (act 402). Outlines of graphical objects can conform to specific orientations. For example, an outermost outline (e.g., the outer outline of an "O") can run clockwise and a first inner outline (e.g., the inner outline of the "O") can run counter-clockwise. Subsequent inner outlines can alternate between clockwise (third, fifth, etc., outlines) and counter-clockwise (fourth, sixth, etc., outlines). Accordingly, the direction of an outline at a local extremum can be determined from the local extrema location on the outline and the location of the outline respective to other outlines of the character (e.g., outermost, first inner, etc.).

Referring back to FIGS. 1 and 3, outlines 131 and 332 (outermost outlines) can have a clockwise orientation. Accordingly, orientation detection module 106 can detect that the orientation of outline 332 at control points 309 and 305 is in a positive Y direction. Similarly, orientation detection module 106 can detect that the orientation of outline 332 at control points 311 and 313 is in a negative X direction. The direction of other identified local extrema on outline 332 can be similarly identified.

The method 400 includes an act of determining that the first local extremum is within a specified tolerance of the second local extremum (act 403). Referring back to FIGS. 1 and 3, tolerance checking module 107 can determine that distance 333 is less than specified tolerance 108. Thus, a local extremum at control point 309 is within a specified tolerance of a local extremum at control point 305. Similarly, tolerance checking module 107 can determine that distance 334 is less than specified tolerance 108. Thus, a local extremum at control point 311 is within a specified tolerance of a local extremum at control point 313. When local extrema are oriented in at least a similar direction and are within a specified tolerance of one another, the local extrema can be identified as being in the same set of local extrema.

Method 400 can be repeated to identify additional local extrema in a set of local extrema. For example, method 400 can be utilized to determine that local extremum at control points 305 and 301 are in the same set. That is, the orientation is in a positive Y direction and distance 336 is less than tolerance 108. Accordingly, it can be determined that local extrema at control points 309, 305 and 301 are in the same set of local extrema and thus on a common edge of outline 332 (edge 321). Similarly, method 400 can be utilized to determine that local extremum at control points 313 and 315 are in the same set. That is, the orientation is in a negative X direction and distance 337 is less than tolerance 108. Accordingly, it can be determined that local extrema at control points 311, 313, and 315 are in the same set of local extrema and thus on a common edge of outline 332 (edge 322).

Specified tolerance 108 can be a fixed value or can be configured based on the properties of a particular font. For example, the tolerance can be increased for fonts that have more pronounced variations along common edges. On the other hand, the tolerance can be decreased for fonts that have less pronounced variations along common edges. Specified tolerance 108 can be manually configured by a user of computing system 102. Alternately, specified tolerance 108 can be automatically configured as a result of filtering module 103 analyzing a plurality of outlines for a particular font to detect the magnitude of variations along common edges. Although tolerance 108 has been described as a distance tolerance, it should be understood that other tolerances, such as, for example, an angle tolerance, can be used.

Returning to FIG. 2, method 200 includes an act of identifying sets of control points that make up common edges of the outline (act 203). For example, filtering module 103 can determine that control points between and at control points 301 and 309 (i.e., control points 301 through 309) are on edge 321. Similarly, filtering module 303 can determine that control points between and at points 311 and 315 (i.e., control points 311 through 315) are on edge 322.

Figure 5:
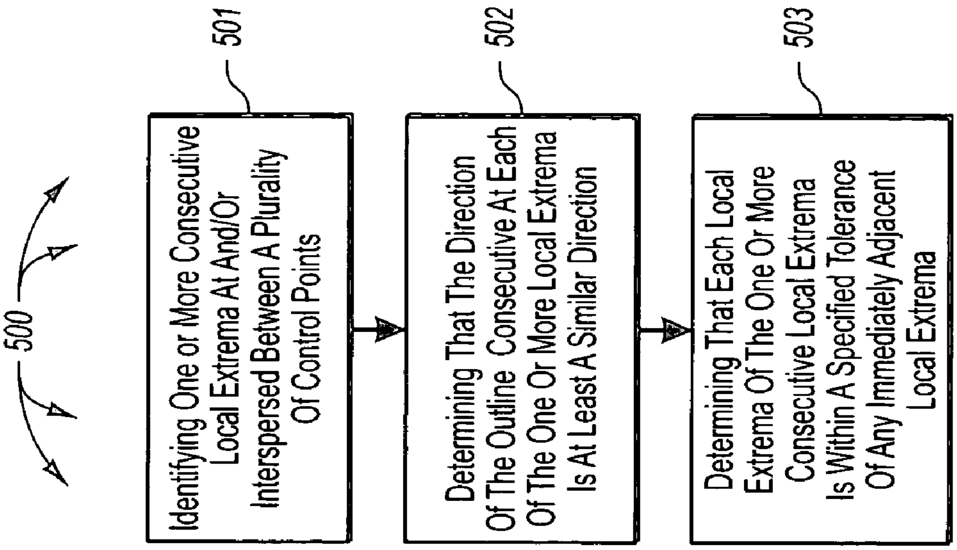
FIG. 5 illustrates a flowchart of a method for determining that a plurality of control points make up a common edge of a graphical object outline.

Referring to FIG. 5, there is shown a more detailed flowchart of a method for determining that a plurality of control points make up a common edge of a graphical object outline. Method 500 includes an act of identifying one or more consecutive local extrema at and/or interspersed between a plurality of control points (act 501). For example, referring back to FIGS. 1 and 3, it may be that extrema identification module 104 identifies a set of local extrema that includes local extremum at control points 301, 305, and 309. Filtering module 103 can determine that control points 301 through 309 are at and/or interspersed between the local extrema. Similarly, extrema identification module 104 can identify at set of local extrema that includes local extremum at control points 311, 313, and 315. Filtering module 103 can determine that control points 311 through 315 are at and/or interspersed between the local extrema.

Method 500 includes an act of determining that the direction of the outline at each of the one or more consecutive local extrema is in at least a similar direction (act 502). For example, referring back to FIGS. 1 and 3, it may be that orientation detection module 106 determines that the direction of outline 332 (at local extremum) at control points 309, 305, and 301 is in a positive Y direction. Similarly, orientation detection module 106 can determine that the direction of outline 332 (at local extremum) at control points 311, 313, and 315 is in a negative X direction.

Method 500 includes an act of determining that each local extrema of the one or more consecutive local extrema is within a specified tolerance of any immediately adjacent local extrema (act 503). For example, referring back to FIGS. 1 and 3, tolerance checking module 107 can determine that distance 333 and distance 336 are less than specified tolerance 108. Similarly, tolerance checking module 107 can determine that distance 334 and distance 337 are less than specified tolerance 108.

Accordingly, since local extrema at control points 309, 305 and 301 are oriented in a positive Y direction and within a specified tolerance of adjacent local extremum, the control points 301 through 309 can be viewed as being on edge 321. Similarly, since local extrema at control points 311, 313, and 315 are oriented in a negative X direction and within a specified tolerance of adjacent local extremum, the control points 311 through 315 can be viewed as being on edge 322.

Returning to FIG. 2, method 200 includes an act of generating simplified control data that represents the outline of the common edges (act 204). For example, filtering module 103 can generate simplified control data 109. Simplified control data 109 can represent the outline of a simplified graphical object, such as, for example, simplified graphical object 122 or simplified graphical object 341.

Control points 101 and simplified control data 109 can be received at object processing modules 111. Utilizing simplified control data 109, object processing modules 111 may be able to more efficiently determine that control points 101 represent an "H". Accordingly, scaling module 112, hinting module 113, and scan conversion module 114 can interoperate to appropriately manipulate the control points and corresponding computer-executable instructions such that a better pixelated representation (e.g., pixelated representation 116) of the graphical object is rendered at display device 117.

Figure 6:
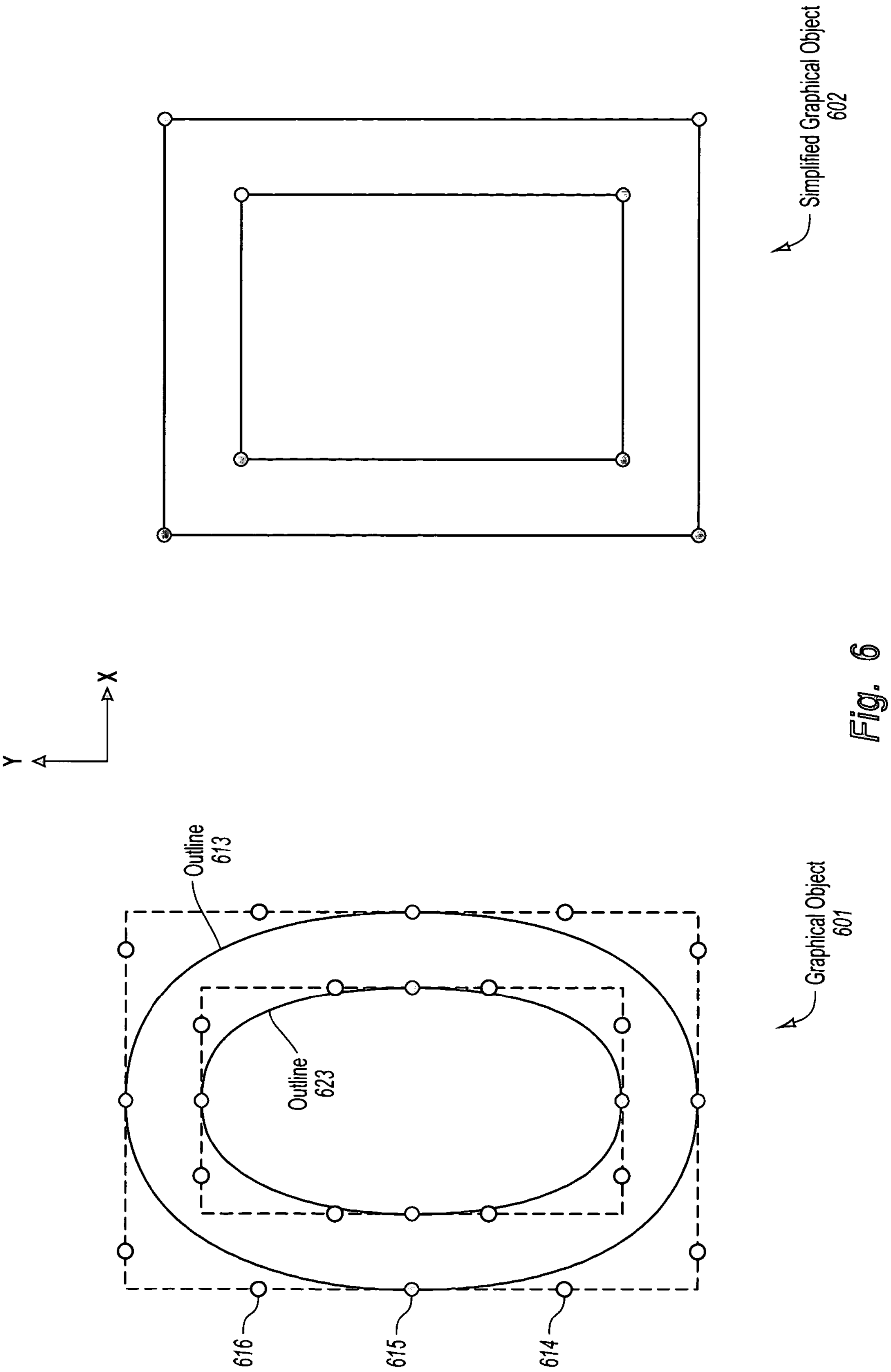
FIG. 6 illustrates a second example of a graphical object and a corresponding simplified graphical object.

Although embodiments of the invention have been described with respect to graphical objects having edges in essentially vertical and horizontal directions, the invention is not limited to such graphical objects. For example, embodiments of the invention can filter outlines of graphical objects that include rounded or diagonal edges. FIG. 6 illustrates a second example of a graphical object 601 and a corresponding simplified graphical object 602. As depicted, graphical object 601 includes some control points that are on outlines 613 and 623 and some control points that are off of outlines 613 and 623. The combination of on and off outline control points provides appropriate data for connecting control points with Bezier curves to generate outlines 613 and 623. Due to the properties of the Bezier curves, the simplified graphical object 602 can be derived from the control points of graphical object 601.

For example, it is a property of Bezier curves that the direction of the curve at on-curve control points (e.g., control point 615) is equivalent to the direction defined by a straight line from that on-curve control point to its immediately adjacent off-curve control point (e.g., control points 614 and 616). Accordingly, taking the first derivative of the Bezier curve of the outer contour, bottom left corner, at on-curve control point 615, indicates a straight line through control points 614 and 615. Similarly, taking the first derivative of the Bezier curve of the outer contour, top left corner, at on-curve control point 615, indicates a straight line through control points 615 and 616. Consequently, if the curve is to be smooth at control point 615 (i.e., if it isn't allowed to have a "dent") then control points 614, 615, and 616 can be calculated as being on the same straight line (or on a common edge).

In practice, for example, as a result of converting fonts from one format to another (e.g., converting them from PostScript® to TrueType®), it may be that control points 614 and 616 are slightly offset from control point 615 in the X-direction. Connecting these control points (614, 615, and 616) with straight lines resulting from first derivative calculations (dashed lines in FIG. 6), can result in variations and local extrema that may be similar to those of graphical object 331. Accordingly, round strokes can be handled similarly to straight strokes, and may even use the same measuring tolerances.

Figure 7:
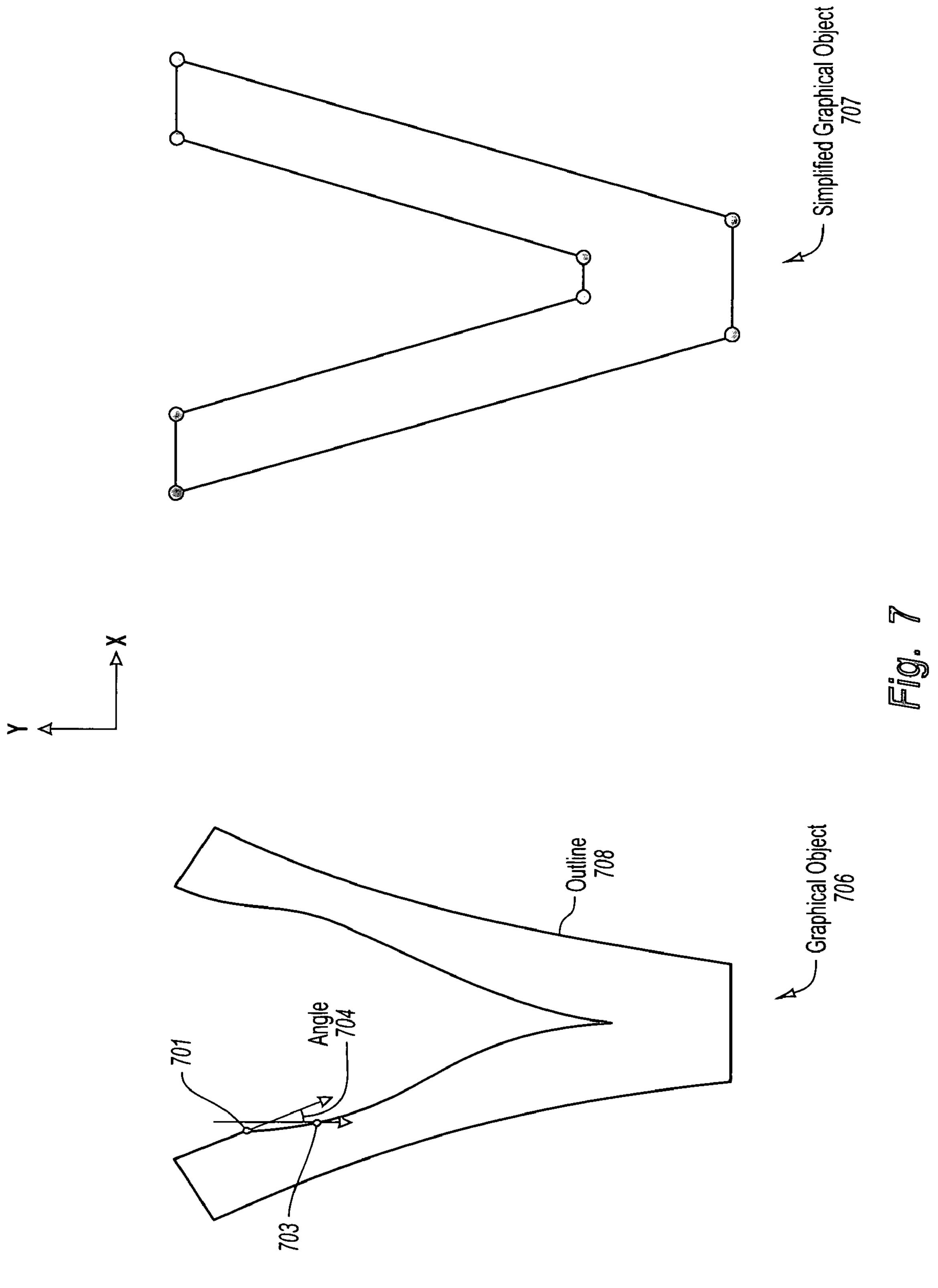
FIG. 7 illustrates a third example of a graphical object and a corresponding simplified graphical object.

FIG. 7 illustrates a third example of a graphical object 706 and a corresponding simplified graphical object 707. When identifying common diagonal edges, local extrema can be identified as being on the same edge when the local extrema are within a specified angle tolerance of one another. For example, the angular difference between the orientation of outline 708 at local extrema 701 and the orientation of outline 708 at local extrema 703 is angle 704. If angle 704 is less than a specified angle tolerance (e.g., specified tolerance 108), local extrema 701 and 703 can be identifier as being on a common edge of outline 708. Other edges can be identified in a similar manner resulting in simplified control data for representing simplified graphical object 707.

Figure 8:
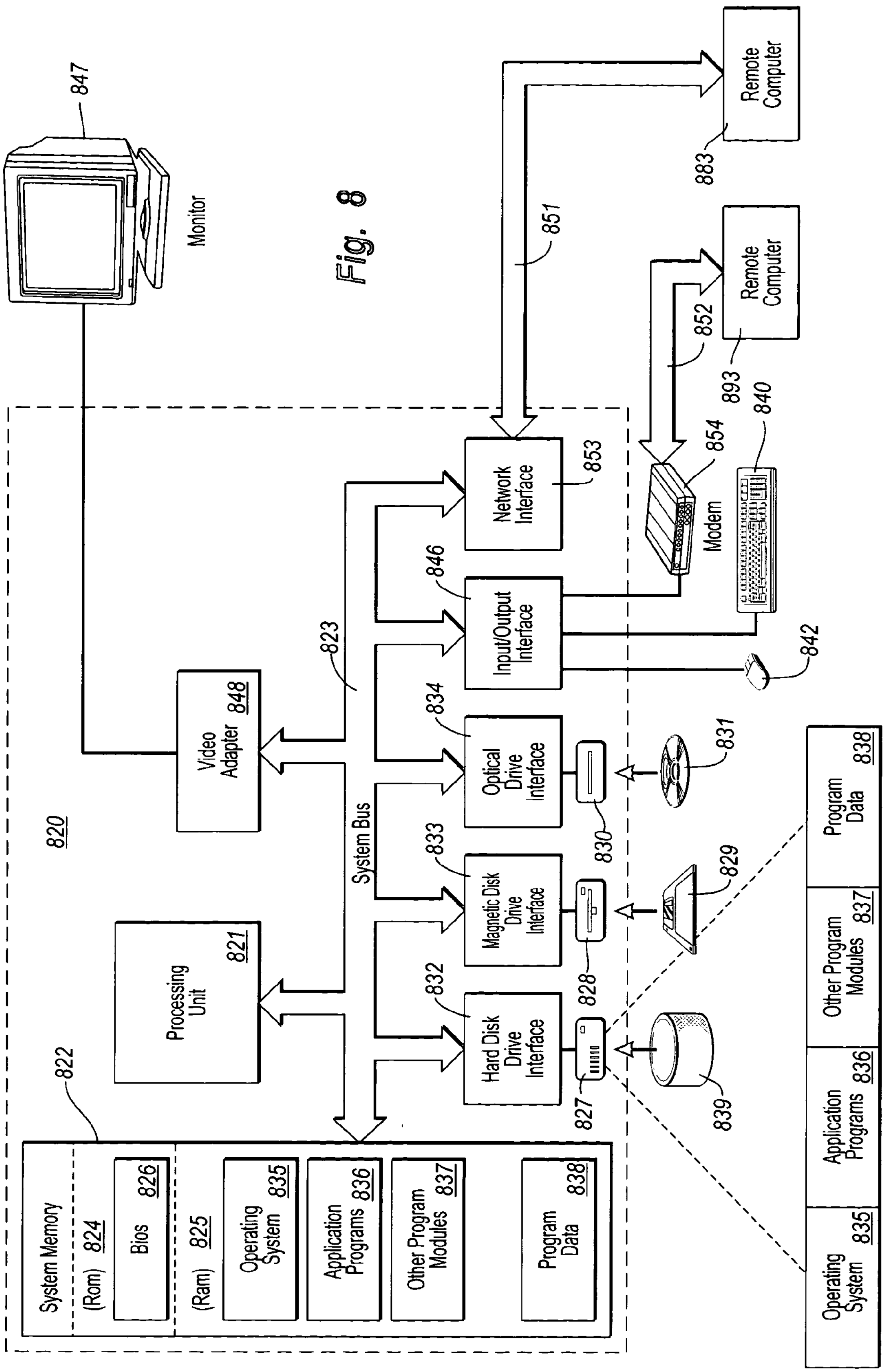
FIG. 8 illustrates a suitable operating environment for implementing the principles of the present invention.

FIG. 8 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed wherein.

With reference to FIG. 8, an example system for implementing the invention includes a general-purpose computing device in the form of computer system 820, including a processing unit 821, a system memory 822, and a system bus 823 that couples various system components including the system memory 822 to the processing unit 821. Processing unit 821 can execute computer-executable instructions designed to implement features of computer system 820, including features of the present invention. The system bus 823 may be any of several types of bus structures including a memory bus or memory controller, a peripheral bus, and a local bus using any of a variety of bus architectures. The system memory includes read only memory ("ROM") 824 and random access memory ("RAM") 825. A basic input/output system ("BIOS") 826, containing the basic routines that help transfer information between elements within computer system 820, such as during start-up, may be stored in ROM 824.

The computer system 820 may also include magnetic hard disk drive 827 for reading from and writing to magnetic hard disk 839, magnetic disk drive 828 for reading from or writing to removable magnetic disk 829, and optical disk drive 830 for reading from or writing to removable optical disk 831, such as, or example, a CD-ROM or other optical media. The magnetic hard disk drive 827, magnetic disk drive 828, and optical disk drive 830 are connected to the system bus 823 by hard disk drive interface 832, magnetic disk drive-interface 833, and optical drive interface 834, respectively. The drives and their associated computer-readable media provide nonvolatile storage of computer-executable instructions, data structures, program modules, and other data for the computer system 820. Although the example environment described herein employs magnetic hard disk 839, removable magnetic disk 829 and removable optical disk 831, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 839, magnetic disk 829, optical disk 831, ROM 824 or RAM 825, including an operating system 835, one or more application programs 836, other program modules 837, and program data 838. A user may enter commands and information into computer system 820 through keyboard 840, pointing device 842, or other input devices (not shown), such as, for example, a microphone, joy stick, game pad, scanner, or the like. These and other input devices can be connected to the processing unit 821 through input/output interface 846 coupled to system bus 823. Input/output interface 846 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 847 or other display device is also connected to system bus 823 via video interface 848. Monitor 847 can display graphical objects, including text, generated by computer system 820. Other peripheral devices (not shown), such as, for example, speakers, printers, and scanners, can also be connected to computer system 820. Printers connected to computer system 847 can print graphical objects, including text, generated by computer system 820.

Computer system 820 is connectable to networks, such as, for example, an office-wide or enterprise-wide computer network, a home network, an intranet, and/or the Internet. Computer system 820 can exchange data with external sources, such as, for example, remote computer systems, remote applications, and/or remote databases over such networks.

Computer system 820 includes network interface 853, through which computer system 820 receives data from external sources and/or transmits data to external sources. As depicted in FIG. 8, network interface 853 facilitates the exchange of data with remote computer system 883 via link 851. Network interface 853 can logically represent one or more software and/or hardware modules, such as, for example, a network interface card and corresponding Network Driver Interface Specification ("NDIS") stack. Link 851 represents a portion of a network (e.g., an Ethernet segment), and remote computer system 883 represents a node of the network.

Likewise, computer system 820 includes input/output interface 846, through which computer system 820 receives data from external sources and/or transmits data to external sources. Input/output interface 846 is coupled to modem 854 (e.g., a standard modem, a cable modem, or digital subscriber line ("DSL") modem), through which computer system 820 receives data from and/or transmits data to external sources. As depicted in FIG. 8, input/output interface 846 and modem 854 facilitate the exchange of data with remote computer system 893 via link 852. Link 852 represents a portion of a network and remote computer system 893 represents a node of the network.

While FIG. 8 represents a suitable operating environment for the present invention, the principles of the present invention may be employed in any system that is capable of, with suitable modification if necessary, implementing the principles of the present invention. The environment illustrated in FIG. 8 is illustrative only and by no means represents even a small portion of the wide variety of environments in which the principles of the present invention may be implemented.

In accordance with the present invention, object processing modules, such as, for example, filtering module 103, as well as associated program data, such as, for example, control points 101 and pixelated representation 116, can be stored and accessed from any of the computer-readable media associated with computer system 820. For example, portions of such modules and portions of associated program data may be included in operating system 835, application programs 836, program modules 837 and/or program data 838, for storage in system memory 822.

When a mass storage device, such as, for example, magnetic hard disk 839, is coupled to computer system 820, such modules and associated program data may also be stored in the mass storage device. In a networked environment, program modules depicted relative to computer system 820, or portions thereof, can be stored in remote memory storage devices, such as, system memory and/or mass storage devices associated with remote computer system 883 and/or remote computer system 893. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method in a computing system that has access to a set of control points defining an outline of a graphical object for simplifying the control data that represents the outline of the graphical object, the method comprising:

identifying a plurality of local extrema on the outline of the graphical object;

identifying a plurality of sets of local extrema, each local extremum in a set of local extrema being on a common edge of the outline of the graphical object, each set of local extrema including one or more local extremum from the plurality of identified local extrema;

determining that control points interspersed between local extrema or at the local extremum of each set of local extrema are on a common edge of a simplified outline, including when the control points are off of the outline of the graphical object;

generating simplified control data that represents an outline of the common edges of a simplified graphical object, the simplified graphical object having been derived from the graphical object, the simplified control data defining a common edge including straight line segments defined by and through the control points that are interspersed between local extrema or at the local extremum, including when the control points are off of the outline of the graphical object; using the simplified control data to display the graphical object on a display device.

2. The method as recited in claim 1, wherein identifying a plurality of local extrema on the outline of the graphical object comprises determining that the outline increases or decreases in the same direction at points adjacent to a point that is a prospective local extremum.

3. The method as recited in claim 1, wherein identifying a plurality of local extrema on the outline of the graphical object comprises identifying a plurality of local extrema on the outline of a typographical character.

4. The method as recited in claim 1, wherein identifying a plurality of local extrema on the outline of the graphical object comprises calculating the derivative of an equation that defines how one or more control points are to be connected when rendering a portion of the outline.

5. The method as recited in claim 1, wherein identifying a plurality of sets of local extrema comprises determining that a plurality of local extrema are oriented in at least a similar direction.

6. The method as recited in claim 5, wherein determining that a plurality of local extrema are oriented in at least a similar direction comprises determining that a plurality of local extrema are oriented in the same direction.

7. The method as recited in claim 1, wherein identifying a plurality of sets of local extrema comprises determining that each local extremum in the plurality of local extrema is within a specified tolerance of immediately adjacent local extrema or control points.

8. The method as recited in claim 7, wherein determining that each local extremum in a plurality of local extrema is within a specified tolerance of immediately adjacent local extrema or control points comprises determining that each local extremum in a plurality of local extrema is within specified distance tolerance of immediately adjacent local extrema or control points.

9. The method as recited in claim 7, wherein determining that each local extremum in a plurality of local extrema is within a specified tolerance of immediately adjacent local extrema or control points comprises determining that each local extremum in a plurality of local extrema is within specified angle tolerance of immediately adjacent local extrema or control points.

10. The method as recited in claim 1, wherein generating simplified control data that represents an outline of the common edges of the simplified graphical object comprises generating a reduced set of control points, the reduced set of control points representing the features of the outline without representing some variations that would otherwise be included in the outline.

11. The method as recited in claim 1, wherein generating simplified control data that represents an outline of the common edges of the simplified graphical object comprises generating simplified control data that represents an outline of the common edges of a typographical character.

12. A method in a computing system that has access to a set of control points representing an outline of a graphical object for determining that a local extremum and a control point off of the outline of the graphical object are on a common edge of a simplified outline, the method comprising:

identifying consecutive local extrema on the outline and one or more control points off of the outline;

determining that the direction of the outline at both the consecutive local extrema and one or more control points off of the outline is at least a similar direction;

determining that the local extremum is within a specified tolerance of the control point off of the outline;

generating simplified control data that represents an outline of common edges of a simplified graphical object of the graphical object, the simplified control data defining a common edge including straight line segments defined by and through the control points that are interspersed between local extrema or at the local extremum, including when the control points are off of the outline of the graphical object, using the simplified control data to display the graphical object on a display device.

13. The method as recited in claim 12, wherein identifying consecutive local extremum on the outline and control point off of the outline comprises identifying an extremum and control point of a typographical character.

14. The method as recited in claim 12, wherein identifying consecutive local extremum on the outline and control point off of the outline comprises determining that the outline increases or decreases in the same direction at points adjacent to the local extremum.

15. The method as recited in claim 12, wherein identifying consecutive local extremum on the outline and control point off of the outline comprises taking the derivative of an equation that defines how the local extremum and control point are to be connected when rendering the outline.

16. The method as recited in claim 12, wherein determining that the direction of the outline at both the consecutive local extremum and control point off of the outline is at least a similar direction comprises determining that the direction of the outline at both the local extremum and control point is the same direction.

17. The method as recited in claim 12, wherein determining that the local extremum is within a specified tolerance of the control point off of the outline comprises determining that the local extremum is within a specified distance tolerance of the or control point.

18. The method as recited in claim 12, wherein determining that the local extremum is within a specified tolerance of the control point off of the outline comprises determining that the local extrema is within a specified angle tolerance of the control point.

19. A computer program product comprising one or more physical computer-readable media having stored therein computer-executable instructions that, when executed by a processor, cause a computing system to:

Identify a plurality of local extrema on the outline of the graphical object;

Identify a plurality of sets of local extrema, each local extremum in a set of local extrema being on a common edge of the outline of the graphical object, each set of local extrema including one or more local extremum from the plurality of identified local extrema;

Determine that control points interspersed between local extrema or at the local extremum of each set of local extrema are on a common edge of a simplified outline including when the control points are off of the outline of the graphical object; and Generate simplified control data that represents an outline of the common edges of a simplified graphical object, the simplified graphical object having been derived from the graphical object, the simplified control data defining a common edge including straight line segments defined by and through the control points that are at least one of interspersed between local extrema or at the local extremum, including when the control points are off of the outline of the graphical object; and Use the simplified control data to display the graphical object on a display device.

20. The method as recited in claim 1, further comprising translating the simplified control data into hinting instructions.

21. The method as recited in claim 1, further comprising using the simplified control data to facilitate recognition of the graphical object.

22. The method as recited in claim 21 further comprising manipulating control points using the recognition such that a better pixelated representation of the graphical object is rendered.

* * * * *